United States Patent
Fukuda et al.

(10) Patent No.: US 7,288,336 B2
(45) Date of Patent: Oct. 30, 2007

(54) MEMBRANE ELECTRODE ASSEMBLY OF SOLID POLYMER ELECTROLYTE FUEL CELL

(75) Inventors: Kaoru Fukuda, Saitama (JP); Ryoichiro Takahashi, Saitama (JP); Junji Matsuo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/264,589

(22) Filed: Oct. 31, 2005

(65) Prior Publication Data
US 2006/0099487 A1    May 11, 2006

(30) Foreign Application Priority Data
Nov. 10, 2004   (JP)   .............................. 2004-327072

(51) Int. Cl.
H01M 4/00    (2006.01)
(52) U.S. Cl. .......................................... 429/44; 429/40
(58) Field of Classification Search ................ 429/44, 429/39, 40
See application file for complete search history.

(56) References Cited

U.S. PATENT DOCUMENTS

2002/0068213 A1*  6/2002  Kaiser et al. ................. 429/40
2004/0115517 A1*  6/2004  Fukuda et al. ................. 429/44
2006/0002844 A1*  1/2006  Suenaga et al. ......... 423/447.3

FOREIGN PATENT DOCUMENTS

JP   2003-142112      5/2003
JP   2004-158388   *  3/2004

OTHER PUBLICATIONS

IPDL JPO Machine Translation for JP 2004-158388 (publication date of Mar. 2004).*

* cited by examiner

Primary Examiner—Patrick Joseph Ryan
Assistant Examiner—Eugenia Wang
(74) Attorney, Agent, or Firm—Fish & Richardson P.C.

(57) ABSTRACT

A membrane electrode assembly for solid polymer electrolyte fuel cell includes an anode electrode, a cathode electrode, and a polymer electrolyte membrane sandwiched by these electrodes, the catalyst layer of cathode electrode contains a Pt—Co catalyst that is Pt—Co alloys supported by an electrical conductive material, and crystalline carbon fibers, improving the catalyst activity and controlling the oxidization corrosion reaction of the catalyst carrier can be carried out, and providing a high initial performance and superior durability.

6 Claims, 4 Drawing Sheets

MEMBRANE ELECTRODE ASSEMBLY OF SOLID POLYMER ELECTROLYTE FUEL CELL

CROSS-REFERENCE TO RELATED APPLICATION

Priority is claimed on Japanese Patent Application No. 2004-327072, filed Nov. 10, 2004, the content of which is incorporated herein by reference.

BACKGROUND OF THE INVENTION

1. Field of the Invention

This present invention relates to a membrane electrode assembly of a solid polymer electrolyte fuel cell, in particular, which has a high initial performance and a superior durability.

2. Description of Related Art

In recent years, a fuel cell are anticipated as a means of reducing global warming and environmental disruption and a solution to energy problems, and thus research and development on fuel cells is being enthusiastically conducted. A fuel cell uses hydrogen gas as a fuel gas and generates energy by an electrochemical reaction of hydrogen and oxygen, and there are various types of fuel cells including a phosphoric acid fuel cell, a molten carbonate fuel cell, a solid electrolyte type fuel cell, and a solid polymer electrolyte fuel cell. Among these, a solid polymer electrolyte fuel cell can start operation at room temperature and can also provide higher output with small configuration, and thus receives attention as a power source for two-wheeled or four-wheeled vehicles, or portable power supply.

In this solid polymer electrolyte fuel cell, the basic structure unit is a membrane electrode assembly, which is sandwiched between separators to make a single cell and then combined with several tens to hundreds of single cells to be used as a stack (battery). The membrane electrode assembly, which is the basic structure unit, is formed from these two electrodes that are anode (fuel) and a cathode (air) electrode, and a polymer electrolyte membrane sandwiched by these two electrodes. Both electrodes are formed from a catalyst layer that is close against the polymer electrolyte membrane and conducts oxidization/reductive reaction, and a gas diffusion layer close against this catalyst layer. The catalyst layer allocated to both electrodes is formed from an ion conductive material, and a catalyst that is a metal is supported by an electrical conductive material such as carbon. The solid polymer electrolyte fuel cell that is formed from components like these supplies the anode electrode side with fuel including hydrogen, and generates electricity by supplying the cathode electrode side with oxygen or air.

Conventionally, a solid polymer electrolyte fuel cell has a problem in that the performance is decreased by long-term use. The first factor to decrease the performance is that catalyst activity is deteriorated by a sintering of the catalyst metal. The second factor is that an oxidization corrosion reaction of a catalyst carrier such as carbon progresses. The third factor is that the deterioration of the gas diffusivity that is caused by crushing electrode of a bearing pressure. For the solution to this problem, a solid polymer electrolyte fuel cell, in which a catalyst layer of a cathode electrode has a Pt—Co catalyst that is Pt—Co alloys supported by carbon, has been suggested thereto(refer to Patent Document 1). This Pt—Co catalyst has an effect that the particle size increase by a sintering of the catalyst is controlled, by alloying platinum and cobalt. Therefore, this Pt—Co catalyst has high catalyst activity compared with the typical conventional used platinum catalyst, so that a solid polymer electrolyte fuel cell having superior power generation performance can be provided.

[Patent Document (1)] Japanese Patent Application Laid-Open No. 2003-142112

However, while catalyst activity is high, this Pt—Co catalyst causes a corrosion of a catalyst carrier such as carbon. Accordingly, by long-term electrical energy generation, the corrosion of catalyst carrier such as carbon progresses causes a deterioration of power generation performance.

SUMMARY OF THE INVENTION

The present invention has been made in view of the above-mentioned problem, and an object of the present invention is to provide a membrane electrode assembly of a solid polymer electrolyte fuel cell having a high initial performance and a superior durability.

A membrane electrode assembly of a solid polymer electrolyte fuel cell having high initial performance and superior durability is provided, by containing a Pt—Co catalyst that is Pt—Co alloys supported by an electrical conductive material and crystalline carbon fibers in a catalyst layer of a cathode electrode. More specifically, the present invention provides the following:

(1) A membrane electrode assembly of a solid polymer electrolyte fuel cell includes: an anode electrode; a cathode electrode; and a polymer electrolyte membrane that is sandwiched by these electrodes; both the electrodes are formed from a catalyst layer close against the polymer electrolyte membrane, and a gas diffusion layer close against the catalyst layer, and the catalyst layer of the cathode electrode contains a Pt—Co catalyst that is Pt—Co alloys are supported by an electrical conductive material, an ion conductive material, and crystalline carbon fibers.

A membrane electrode assembly according to (1) wherein a catalyst layer of a cathode electrode contains Pt—Co catalyst that is Pt—Co alloys supported by an electrical conductive material, an ion conductive material, and crystalline carbon fibers. The Pt—Co catalyst can avoid a sintering of the catalyst that is described above and have high catalyst activity, so that superior power generation performance can be achieved. In addition, by the existence of crystalline carbon fibers, electrode resistance falls causes a decrease of calorific value. Accordingly, excessive thermal energy applied to the catalyst carrier such as carbon is controlled, and thus a progress of the oxidization corrosion reaction can be controlled. Furthermore, by the existence of crystalline carbon fibers, crushing of an electrode by applying a bearing pressure can be controlled, and thus a deterioration of gas diffusivity can be controlled. Therefore, according to the membrane electrode assembly described in (1), a solid polymer electrolyte fuel cell having a high initial performance and a superior durability can be provided.

(2) The membrane electrode assembly of the solid polymer electrolyte fuel cell according to (1) may be one in which the ignition temperature of the Pt—Co catalyst is 340° C. (degrees Celsius) or more in the air.

In the Pt—Co catalyst used in the membrane electrode assembly according to (2), the ignition temperature is 340° C. (degrees Celsius) or more in the air. Thus, the Pt—Co catalyst has a superior oxidation resistance, so that the membrane electrode assembly according to (2), which uses this Pt—Co catalyst, is controlled from oxidization and degradation by long-term use, and has a stable power generation performance for a long time. Therefore, according to the membrane electrode assembly described in (2), a solid polymer electrolyte fuel cell having a high initial performance and a superior durability can be provided.

(3) The membrane electrode assembly of the solid polymer electrolyte fuel cell according to (1) may be one in which the mass reduction rate of the Pt—Co catalyst is 10% or less when the Pt—Co catalyst is held at 150° C. (degrees Celsius) in the air for 500 hours.

In the Pt—Co catalyst used in the membrane electrode assembly according to (3), the mass reduction rate of the Pt—Co catalyst is 10% or less when the Pt—Co catalyst is held at 150° C. (degrees Celsius) in the air for 500 hours. In typical conventional Pt catalyst or the like, carbon black of a carrier corrodes over long-term use so that a large mass reduction is observed; however, in this Pt—Co catalyst, the mass reduction rate is controlled. Thus, a catalyst metal desorption by a surface corrosion of a catalyst carrier such as carbon can be prevented. Therefore, according to the membrane electrode assembly described in (3), a solid polymer electrolyte fuel cell having a high initial performance and a superior durability can be provided.

(4) The membrane electrode assembly of the solid polymer electrolyte fuel cell according to (1) may be one in which the thickness reduction rate of the catalyst layer of the cathode electrode is 20% or less when the catalyst layer is held under a bearing pressure of 20 kg/cm$^2$ at 120° C. (degrees Celsius) for 1000 hours.

The thickness reduction rate of the catalyst layer of the cathode electrode in the membrane electrode assembly according to (4) is 20% or less when the catalyst layer is held at 120° C. (degrees Celsius) under a bearing pressure of 20 kg/cm$^2$ for 1000 hours. Thus, the membrane electrode assembly according to (4) can avoid crushing an electrode by applying a bearing pressure, and has gas diffusivity and water discharge characteristic in superiority and stability. These gas diffusivity and water discharge characteristic greatly influence power generation performance of the membrane electrode assembly. In particular, when the gas diffusivity is satisfied, oxygen gas is equally diffused in the catalyst layer of the cathode electrode so that the electrode reaction effectively progresses. Alternatively, when the water discharge characteristic is satisfied, a development of flooding phenomena, in which water collected in gas diffusion flow passages such as pores in the catalyst layer obstructs gas diffusion, can be avoided. That is, the membrane electrode assembly, which has these superior gas diffusivity and water discharge characteristic, satisfies power generation performance. Therefore, according to the membrane electrode assembly described in (4), a solid polymer electrolyte fuel cell having a high initial performance and a superior durability thereof can be provided.

(5) The membrane electrode assembly of the solid polymer electrolyte fuel cell according to (1) may be one in which the mean lattice plane spacing of the [002] plane of the crystalline carbon fiber is 0.345 nm (nanometer) or less, the fiber diameter thereof is 0.1 to 0.5 μm (micrometers), the fiber length thereof is 10 μm (micrometers) to 40 μm (micrometers), the bulk density thereof is 0.02 g/cm$^3$ to 0.10 g/cm$^3$, the specific surface area thereof is 5 m$^2$/g to 20 m$^2$/g, and the specific resistance is 0.025 Ω·cm (ohm-cm)or less.

The membrane electrode assembly of the solid polymer electrolyte fuel cell according to (5) wherein the mean lattice plane spacing of the [002] plane of the crystalline carbon fiber is 0.345 nm (nanometer) or less, the fiber diameter thereof is 0.1 μm (micrometers) to 0.5 μm (micrometers), the fiber length thereof is 10 μm (micrometers) to 40 μm (micrometers), the bulk density thereof is 0.02 g/cm$^3$ to 0.10 g/cm$^3$, the specific surface area thereof is 5 m$^2$/g to 20 m$^2$/g, and the specific resistance is 0.025 Ω·cm (ohm-cm) or less. According to the membrane electrode assembly described in (5), which uses the crystalline carbon fiber having such physical properties, the effect as described above, which the crystalline carbon fiber has, can be fully achieved, and a membrane electrode assembly of a solid polymer electrolyte fuel having a high initial performance and a superior durability can be provided.

According to the present invention, a solid polymer electrolyte fuel cell having a high initial performance and a superior durability can be provided.

DESCRIPTION OF THE PREFERRED EMBODIMENT

Hereinafter, the present invention will be described with reference to the Figures.

<Overall Structure>

Figure 1:
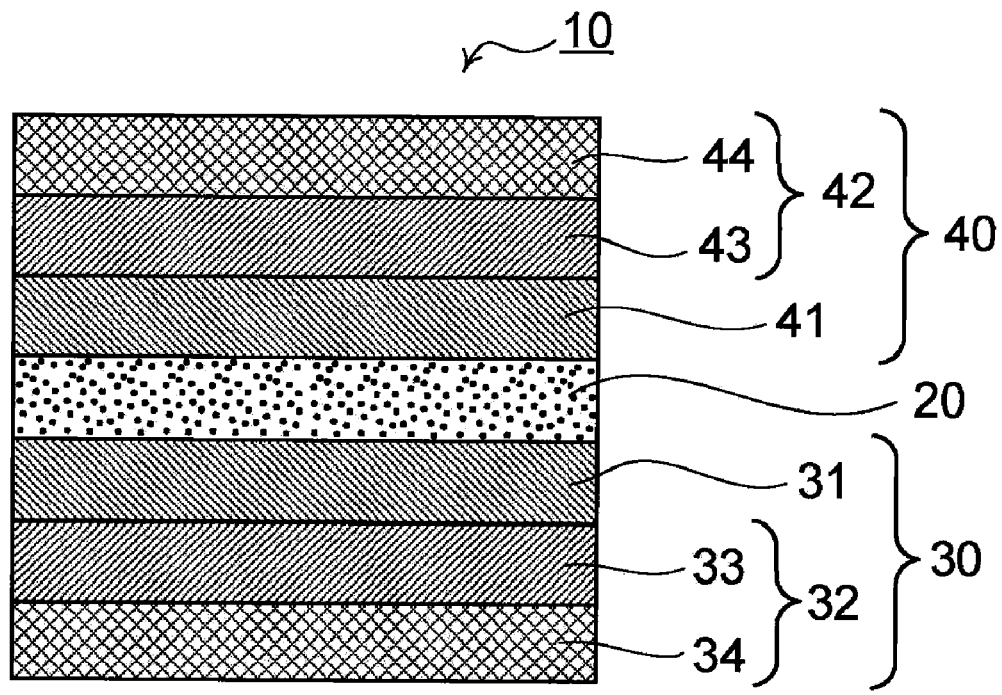
FIG. 1 shows the entire structure of the membrane electrode assembly.

FIG. 1 is a sectional view of an embodiment of membrane electrode assembly 10 which is the basic structural unit of the solid polymer electrolyte fuel cell. As shown in FIG. 1, membrane electrode assembly 10 includes anode electrode 30, cathode electrode 40, and polymer electrolyte membrane 20 sandwiched by these electrodes. Anode electrode 30 is formed from catalyst layer 31 closes against polymer electrolyte membrane 20 and gas diffusion layer 32 closes against this catalyst layer 31. In addition, cathode electrode 40 is formed from catalyst layer 41 closes against polymer electrolyte membrane 20 and gas diffusion layer 42 closes against this catalyst layer 41.

[Polymer Electrolyte Membrane]

Polymer electrolyte membrane 20 is formed from a polymer electrolyte. In particular, the polymer electrolyte, in which a fluoropolymer has at least part of the polymer skeleton being fluorinated or hydrocarbon polymer containing no fluorine in the polymer skeleton, is provided with an ion exchange group. The types of the ion exchange group are not limited although they should be appropriately selected according to the specific application. For example, a polymer electrolyte, which is provided with at least one ion exchange group such as sulfonic acid, carboxylic acid, phosphonic acid or the like, can be used.

A fluoropolymer electrolyte in which at least part of the polymer skeleton is fluorinated, as a polymer electrolyte provided with an ion exchange group, a perfluorocarbon sulfonic acidic polymer such as Nafion (registered trademark), perfluorocarbon phosphonic acidic polymer, trifluorostyrene sulfonic acidic polymer, ethylene tetrafluoro ethylene-g-styrene-sulfonic acidic polymer, etc. Among these, Nafion is preferably used.

A hydrocarbonic polymer, in which no fluoride is contained, as a polymer electrolyte provided with an ion exchange group, specifically includes polysulfonic acid, polyarylether ketone sulfonic acid, polybenzimidazolen alkylphosphonic acid, etc.

[Catalyst Layer of Cathode Electrode]

Catalyst layer 41 of the cathode electrode contains a Pt—Co catalyst in which Pt—Co alloys are supported by an electrical conductive material, an ion conductive material, and a crystalline carbon fiber. The ion conductive material is formed from a polymer electrolyte, and the polymer electrolyte similar to polymer electrolyte membrane 20 is preferably used. In addition, the crystalline carbon fiber means a whisker-shaped fiber with a high crystallinity, for example, it is a concept that includes a true whisker of a monocrystal, a pseudo-whisker of a polycrystal, carbon nanotube, etc. In particular, the crystalline carbon fiber having physical properties that are shown in Table 1 is preferably used.

TABLE 1

| Item | Range | Unit |
|---|---|---|
| [002]plane spacing | $0.345 \geq$ | nm |
| Fiber diameter | 0.1~0.5 | μm |
| Fiber length | 10~40 | μm |
| Bulk density | 0.02~0.10 | g/cm$^3$ |
| True density | 1.8 or more | m$^2$/g |
| Specific surface area | 5~20 | m$^2$/g |
| Specific resistance | $0.025 \geq$ | Ω · cm |
| Hygroscopicity | 0.5> | % |
| Volatile content | 0.3> | % |
| Ash content | 0.05> | % |
| pH | 7 | — |
| Oxidization temperature | >550 | ° C. |

The Pt—Co catalyst is a Pt—Co catalyst in which Pt—Co alloys are supported by carbon as described above, and it is preferred that the ignition temperature of the Pt—Co catalyst used in the present embodiment be 340° C. (degrees Celsius) or more. The ignition temperature is also called the kindling temperature, and means the minimum value of temperature at which a material ignites in the air without a flame, etc. In particular, the ignition temperature in this present specification uses TG-DTA as a measuring apparatus, and can be acquired by measuring on condition that the heating rate in atmospheric air is 10° C. /min (degrees Celsius/min).

It is preferred that the mass reduction rate of the Pt—Co catalyst used in the present embodiment be 10% or less. This mass reduction rate can be acquired by precisely measuring 1 g of a catalyst in a weighing bottle, by settling the weighing bottle in a drying-machine at 150° C. (degrees Celsius) for 500 hours, and then measuring the change in the mass.

Figure 2:
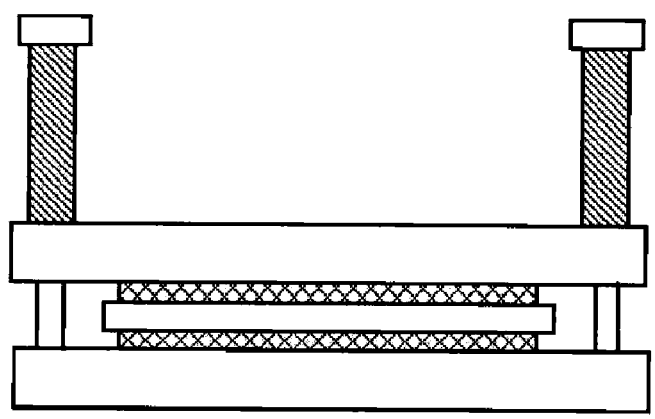
FIG. 2 shows the method for measuring the thickness reduction rate of the catalyst layer.

In the catalyst layer of the cathode electrode in the membrane electrode assembly of the present embodiment, it is preferred that the thickness reduction rate be 20% or less when a bearing pressure 20 kg/cm$^2$ is added at 120° C. (degrees Celsius) for 1000 hours. The thickness reduction rate of this catalyst layer can be acquired by: a 60 mm×60 mm composite of a polymer electrolyte membrane and a catalyst layer, which is previously prepared, is switched in a jig that can adjust a bearing pressure with a screw and a coil spring (cf. FIG. 2), and was settled in a constant temperature and humidity bath, in which the temperature is set to 120° C. (degrees Celsius) and the humidity to 75%, adding a bearing pressure 20 kg/cm$^2$. After 1000 hours, taking out the sample, embedding the sample in an embedding resin such as an epoxy resin, and then, after flatways polishing the embedding resin, measuring the cross section thickness of the catalyst layer by SEM observation. The thickness reduction rate of the catalyst layer can be acquired from the result of measuring the cross section thickness of catalyst layer that is previously made at the early stage in the same condition beforehand.

[Catalyst Layer of Anode Electrode]

Catalyst layer 31 of an anode electrode has a similar structure to a catalyst layer of the general conventional anode electrode, and contains an ion conductive material and a catalyst in which a metal such as platinum is supported by a carrier such as carbon. The ion conductive material is formed from a polymer electrolyte, and a similar polymer electrolyte, which is used for polymer electrolyte membrane 20 or catalyst layer 41 of the cathode electrode, is preferably used. For the catalyst, a catalyst in which platinum is supported by carbon, a Pt—Ru catalyst that alloys of platinum and ruthenium are supported by carbon, etc., can be used.

[Gas Diffusion Layer]

Gas diffusion layer 32 of an anode electrodes side and gas diffusion layer 42 of a cathode electrode side may have similar structures to a general conventional gas diffusion layer, and each side, the gas diffusion layers may have the exactly same structures. In the anode electrode side, it is preferred that the fuel, hydrogen gas, can equally reach to catalyst layer 31, in the cathode electrode side, it is preferred that air containing oxygen gas can equally reach to catalyst layer 41. As shown in FIG. 1, gas diffusion layer 32 of an anode electrode side is formed from carbon Teflon (registered trademark) layer 33 closes against catalyst layer 31, and carbon paper layer 34 closes against this carbon Teflon layer 33. Gas diffusion layer 42 of a cathode electrode side is formed from carbon Teflon layer 43 closes against catalyst layer 41, and carbon paper layer 44 closes against this carbon Teflon layer 43. In addition, these gas diffusion layers, for example, can be provided by applying a material that a polytetra-fluoroethylene dispersion and carbon black powders are mixed on a carbon paper which the water-repellent processing with a polytetra-fluoroethylene dispersion, etc., is previously conducted.

[Manufacturing Method]

A manufacturing method of a membrane electrode assembly concerning the present embodiment is as follows. First, a Pt—Ru catalyst that is alloys of platinum and ruthenium supported by carbon black and a polymer electrolyte are mixed to provide an anode catalyst paste. In similar method, a Pt—Co catalyst that is Pt—Co alloys supported by carbon black and polymer electrolyte are mixed to provide a cathode catalyst paste. Each of the provided anode catalyst paste and cathode catalyst paste is applied to a Teflon sheet, etc. And then an anode electrode sheet and a cathode electrode sheet are provided. Second, polymer electrolyte membrane 20 is sandwiched by the anode electrode sheet and the cathode electrode sheet which are well dehydrated, and then a composite of polymer electrolyte membrane 20 and a catalyst layer are provided by making a transfer print in the decal method (decalcomania process). Third, a paste that is a polytetra-fluoroethylene and carbon black mixed in solvent is applied in a carbon paper separately, after the composite of polymer electrolyte membrane 20 and the catalyst layer is sandwiched by a pair of gas diffusion layer sheets and then unified by using a hot press of 130-160° C. (degrees Celsius), a membrane electrode assembly is provided. In addition, single cell of solid polymer electrolyte fuel cell is provided by sandwiching this membrane electrode assembly by one pair of separators. Furthermore, the separator has a channel, which is used as a supply passage for reaction gas, carbon or metal materials can be combined to be used as desired.

EXAMPLES

The present invention is explained based on examples in further detail. However the present invention is not limited to this explanation.

Example 1

[Preparation of Anode Electrode Sheet]
A Pt—Ru catalyst (TEC61E54 produced by Tanaka Kikinzoku Kogyo K. K.) in which a catalyst metal includes alloys (mole ratio of Pt and Ru is 1:1) of platinum and ruthenium which are supported by a carbon black carrier was prepared. As for this Pt—Ru catalyst, the mass ratio with a carrier and a catalyst metal was 46:54. This Pt—Ru catalyst 10 g was mixed with ion conductive material ("Nafion" DE2021 produced by Du Pont Kabushiki Kaisha) 36.8 g, and then an anode catalyst paste was provided. The provided anode catalyst paste was applied on a FEP (tetrafluoroethylene-hexafluoropropylene copolymer) sheet so that the amount of the catalyst metal became 0.15 mg/cm$^2$, and dried, and then an anode electrode sheet was provided.

[Preparation of Cathode Electrode Sheet]
A Pt—Co catalyst, in which a catalyst metal including Pt—Co alloys (the mole ratio of Pt and Co is 5:1) were supported by a carrier that is a carbon black (BP2000 produced by Cabot Corp.) was burnt at 1,500° C. (degrees Celsius), was prepared. As for this Pt—Co catalyst, the mass ratio with a carrier and a catalyst metal was 48:52. This Pt—Co catalyst 9.6 g, an ion conductive material ("Nafion" DE2021 produced by Du Pont Kabushiki Kaisha) 35 g and crystalline carbon fibers (VGCF produced by Showa Denko K. K.) 2.5 g were mixed, and then a cathode catalyst paste was provided. The provided cathode catalyst paste is applied on a FEP sheet so that the amount of the catalyst metal became 0.30 mg/cm$^2$, and dried, and a cathode electrode sheet was provided.

[Preparation of Composite of Polymer Electrolyte Membrane and Catalyst Layer]
As a polymer electrolyte membrane, a perfluorocarbon sulfonic acidic polymer ("Nafion" DE2021 produced by Du Pont Kabushiki Kaisha) was prepared, and then was sandwiched by the anode electrolyte sheet and the cathode electrolyte sheet. Subsequently, the polymer electrolyte membrane was made a transfer copy by the Decal method (decalcomania process), and then a composite of a polymer electrolyte membrane and a catalyst layer was provided.

[Preparation of Gas Diffusion Layer]
Teflon dispersion (L170J produced in Asahi Glass Co., Ltd) 12.0 g and carbon black (Vulcan XC75 produced in Cabot Corp.) 18.0 g were mixed in ethylene glycol 50 g, and then a foundation layer paste was provided. This foundation layer paste is applied on a carbon paper (TGP060 produced in Toray Industries, Inc.) which was previously water-repellent processed with Teflon dispersion (FEP120J produced in Mitsui Du Pont Polychemical) and dried so that the foundation layer paste was 2.3 mg/cm$^2$, and dried, and then one pair of gas diffusion layer sheets were provided.

[Preparation of Membrane Electrode Assembly]
A composite of a polymer electrolyte membrane and a catalyst layer was sandwiched by a pair of gas diffusion layer sheets that were provided from the above and unified with a hot-press, and then a membrane electrode assembly was provided.

Example 2

Except that carbon black (ketjenblack produced in Lion Corp.) was burnt at 1,500° C. (degrees Celsius) and then used as a carrier of the catalyst which was used for a cathode electrode sheet, a membrane electrode assembly was provided in a similar way as in Example 1.

Example 3

Except that carbon black (ketjenblack produced in Lion Corp.) was burnt at 2,800° C. (degrees Celsius) and then used as a carrier of the catalyst which was used for a cathode electrode sheet, a membrane electrode assembly was provided in a similar way as in Example 1.

Example 4

Except that carbon black (ketjenblack produced in Lion Corp.) was not burnt and then as it is used as a carrier of the catalyst which was used for a cathode electrode sheet, a membrane electrode assembly was provided in a similar way as in Example 1.

Example 5

Except that carbon black (ketjenblack produced in Lion Corp.) was burnt at 1,200° C. (degrees Celsius) and then used as a carrier of the catalyst which was used for a cathode electrode sheet, a membrane electrode assembly was provided in a similar way as in Example 1.

Example 6

Except that carbon black (Vulcan XC-72 produced in Cabot Corp.) was burnt at 1,200° C. (degrees Celsius) and then used as a carrier of the catalyst which was used for a cathode electrode sheet, a membrane electrode assembly was provided in a similar way as in Example 1.

Example 7

Except that carbon black (ketjenblack produced in Lion Corp.) was burnt at 1,500° C. (degrees Celsius), used as a carrier of the catalyst which used for a cathode electrode sheet, and the addition amount of crystalline carbon fibers were 1.6 g, a membrane electrode assembly was provided in a similar way as in Example 1.

Example 8

Except that carbon black (ketjenblack produced in Lion Corp.) was burnt at 1,500° C. (degrees Celsius), used as a carrier of the catalyst which used for a cathode electrode sheet, and the addition amount of crystalline carbon fibers were 1.1 g, a membrane electrode assembly was provided in a similar way as in Example 1.

Comparative Example 1

Except that carbon black (ketjenblack produced in Lion Corp.) was burnt at 1,500° C. (degrees Celsius), used as a carrier of the catalyst which was used for a cathode electrode sheet, and then no crystalline carbon fibers were added, a membrane electrode assembly was provided in a similar way as in Example 1.

[Evaluation]

<Ignition Temperature>

The ignition temperature of the each catalyst used in Examples 1 to 8 or Comparative Example 1 was measured. In particular, TG-DTA (Thermo Plus2/TG-DTA produced in Rigaku Corp.) was used as a measuring apparatus; a measurement was performed at 10° C./min (degrees Celsius/min) of the temperature increase rate in the air.

<Mass Reduction Rate>

The mass reduction rate of the each catalyst used in Examples 1 to 8 or Comparative Example 1 was measured. In particular, 1 g of catalyst was precisely weighed in a weighing bottle, and then allowed to stand in a drying-machine which was previously set to 150° C. (degrees Celsius). After the catalyst had been allowed to stand in a drying-machine for 500 hours, the mass was precisely weighed under a dry atmosphere, and then the mass reduction rate was obtained.

<Thickness Reduction Rate of Catalyst Layer>

The thickness reduction rate of the each catalyst layer used in Examples 1 to 8 or Comparative Example 1 was measured. In particular a 60 mm×60 mm composite of a polymer electrolyte membrane and a catalyst layer, which is previously prepared, sandwiched in a jig that a bearing pressure is adjustable with a screw and a coil spring, and settled the jig in a constant temperature and humidity bath, in which the temperature was set to 120° C. (degrees Celsius) and the humidity to 75%, adding a bearing pressure 20 kg/cm². After 1000 hours, the sample was taken out, embedded in an embedding resin such as epoxy resin, and then, after the embedding resin was flatways polished, the cross section thickness of the catalyst layer was measured by the SEM observation. The thickness reduction rate of the catalyst layer was acquired from the cross section thickness of the catalyst layer that is previously made at the early stage in the same condition.

<Endurance Test>

After the each membrane electrode assembly which was provided by Examples 1 to 8 or Comparative Example 1 was sandwiched by one pair of separators to be a single cell, electric current/voltage performance was confirmed under the following operating conditions.

Operating Condition
Operating temperature: 80° C. (degrees Celsius)
Relative humidity: A (Anode)=C (Cathode)=80%
Utilization rate (Consumption/Supply): A (Anode)=C (Cathode)=60%

Endurance tests were performed after the electric current/voltage performance was confirmed. In particular, under the conditions that operating temperature was 95° C. (degrees Celsius), each relative humidity of both electrodes are 80%, and each utilization rate of both electrodes are 50%, the operation had been conducted in the condition that force current was 1.0 A/cm² for 1000 hours, and then the voltage reduction amount after the operation was acquired. The provided result is shown in Table 2.

TABLE 2

|  | Ignition temperature of catalyst (° C.) | Mass reduction rate of catalyst (%) | Thickness reduction rate of catalyst layer (%) | Voltage reduction amount (mV) |
|---|---|---|---|---|
| Example 1 | 340 | 8 | 14 | 36 |
| Example 2 | 380 | 6.5 | 13 | 28 |
| Example 3 | 420 | 7.2 | 16 | 24 |
| Example 4 | 320 | 9.6 | 15 | 48 |
| Example 5 | 360 | 12 | 14 | 51 |
| Example 6 | 340 | 16 | 15 | 62 |
| Example 7 | 380 | 7.2 | 26 | 54.9 |
| Example 8 | 380 | 7.2 | 32 | 63.1 |
| Comparative Example 1 | 380 | 7.2 | 45 | 126.3 |

Figure 3:
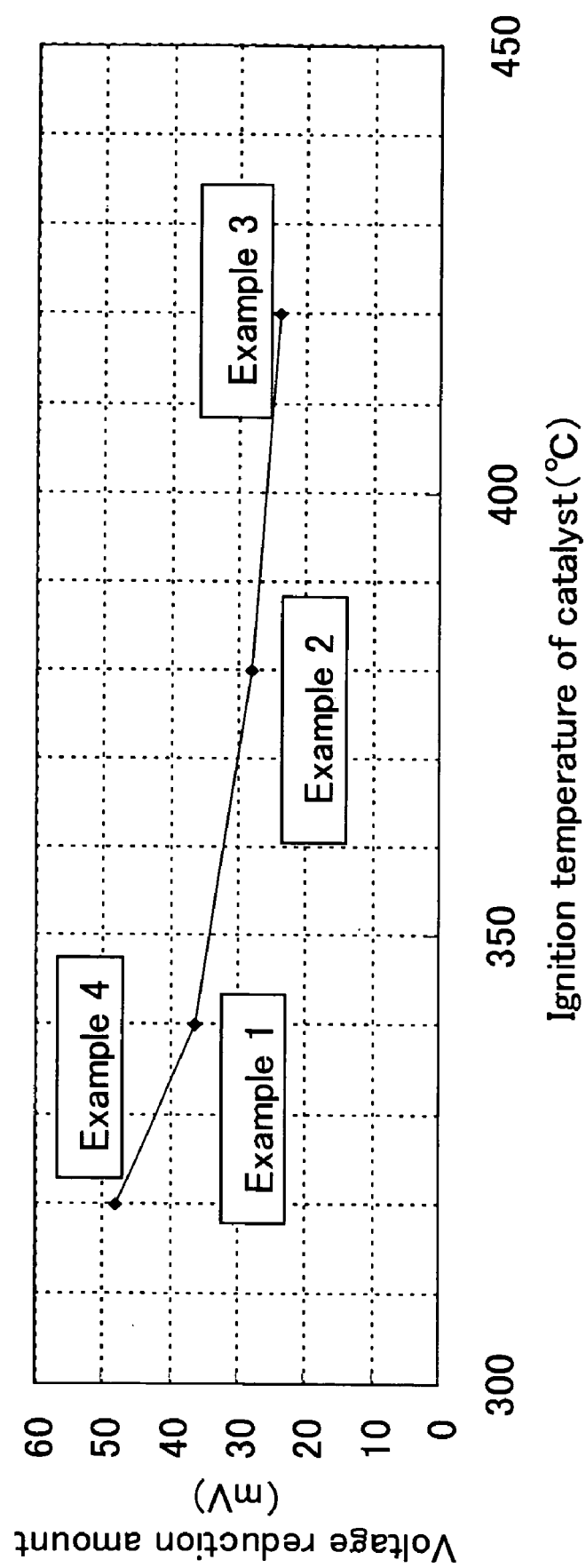
FIG. 3 shows the relationship between the ignition temperature and the voltage reduction amount of the catalyst.
Figure 4:
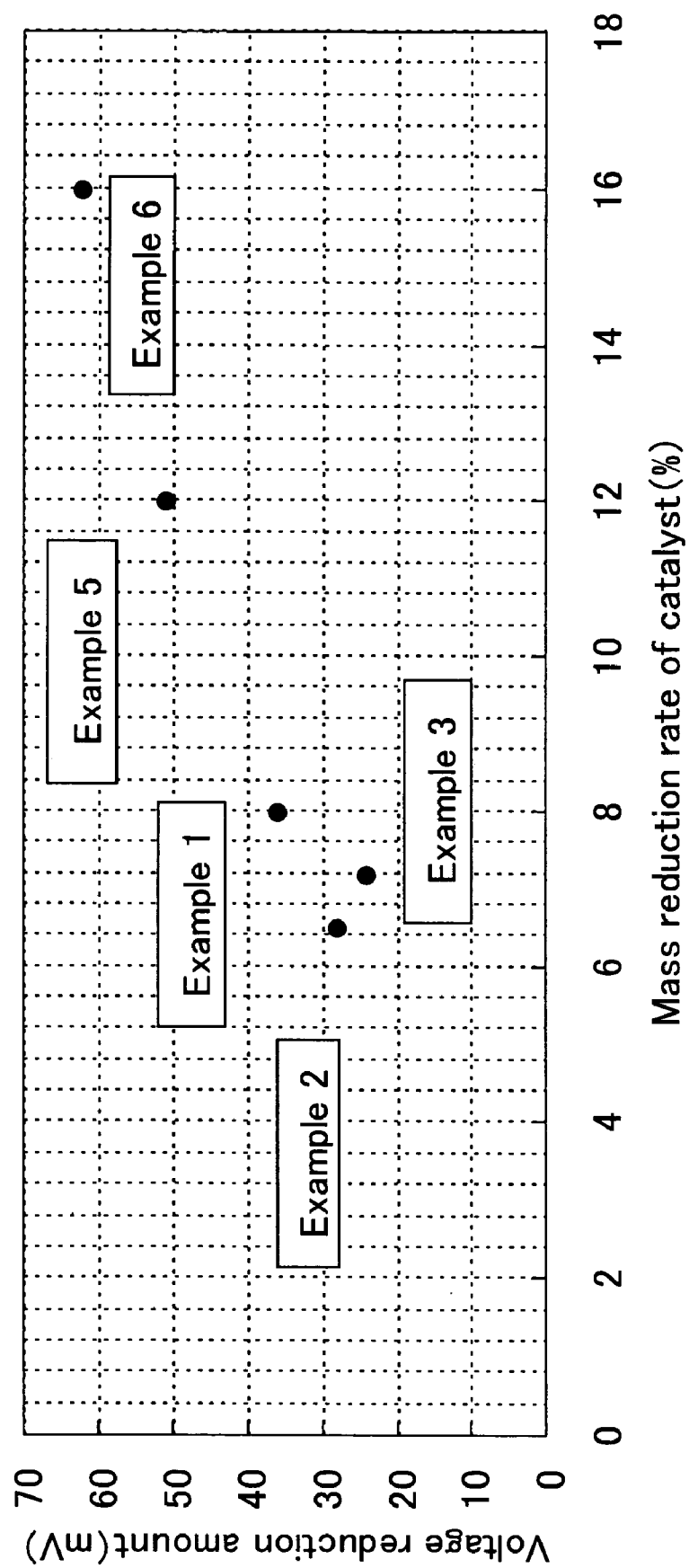
FIG. 4 shows the relationship between the mass reduction rate and the voltage reduction amount of the catalyst.
Figure 5:
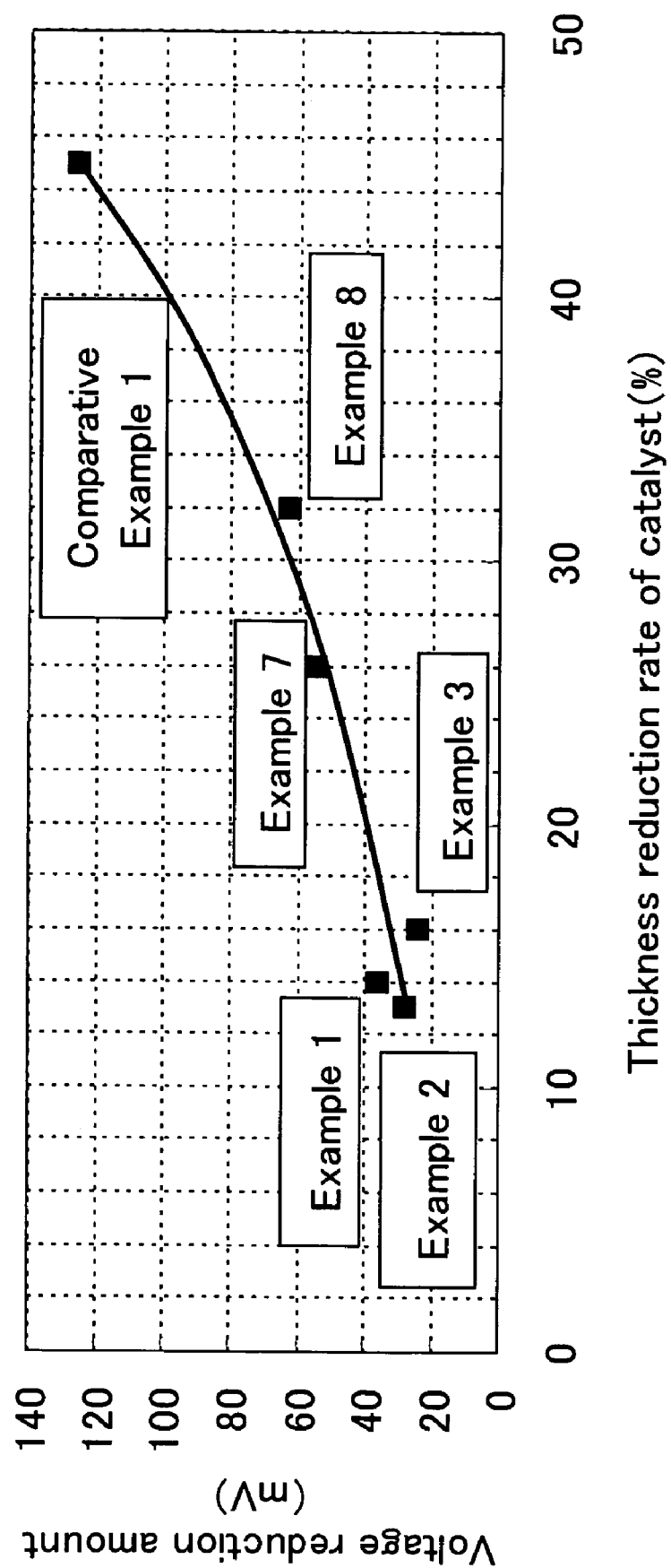
FIG. 5 shows the relationship between the thickness reduction rate and the voltage reduction amount of the catalyst layer.

From the result of Table 2, the relationship between the ignition temperature and the voltage reduction amount of the catalyst is shown in FIG. 3. As shown in FIG. 3, it was confirmed that the higher the ignition temperature of the catalyst, the smaller the voltage reduction amount and also the higher the durability. The relationship between the mass reduction rate and the voltage reduction amount of the catalyst is shown in FIG. 4. As shown in FIG. 4, it was confirmed that the smaller the mass reduction rate of the catalyst, the smaller the voltage reduction amount was and the higher the durability tends to be. The relationship between the thickness reduction rate and the voltage reduction amount of the catalyst layer is shown in FIG. 5. As shown in FIG. 5, it was confirmed that the smaller the thickness rate of the catalyst, the smaller the voltage reduction amount and also the higher the durability.

What is claimed is:

1. A membrane electrode assembly of a solid polymer electrolyte fuel cell comprising:
    an anode electrode;
    a cathode electrode; and
    a polymer electrolyte membrane that is sandwiched by these electrodes;
    wherein both the electrodes are formed from a catalyst layer adjacent the polymer electrolyte membrane, and a gas diffusion layer adjacent the catalyst layer, and
    the catalyst layer of the cathode electrode contains Pt—Co alloys, an electrical conductive, material supporting the Pt—Co alloys, an ion conductive material, and crystalline carbon fibers,
    wherein the mean lattice plane spacing of the plane of a crystalline carbon fiber is 0.345 nm or less, the fiber diameter thereof is 0.1 μm to 0.5 μm, the fiber length thereof is 10 μm to 40 μm, the bulk density thereof is 0.02 g/cm³ to 0.10 g/cm³, the specific surface area thereof is 5 m²/g to 20 m²/g, and the specific resistance thereof is 0.025 Ω·cm or less.

2. The membrane electrode assembly of the solid polymer electrolyte fuel cell according to claim 1 wherein the ignition temperature of the Pt—Co catalyst is 340° C. or more in the air.

3. The membrane electrode assembly of the solid polymer electrolyte fuel cell according to claim 1 wherein the mass reduction rate of the Pt—Co catalyst is 10% or less when the Pt—Co catalyst is held at 150° C. in the air for 500 hours.

4. The membrane electrode assembly of the solid polymer electrolyte fuel cell according to claim 1 wherein the thickness reduction rate of the catalyst layer of the cathode electrode is 20% or less when the catalyst layer is held under a bearing pressure of 20 kg/cm² at 120° C. for 1000 hours.

5. The membrane electrode assembly of the solid polymer electrolyte fuel cell according to claim 1 wherein the electrical conductive material is a material other than crystalline carbon fibers.

6. The membrane electrode assembly of the solid polymer electrolyte fuel cell according to claim 1 wherein the electrical conductive material is carbon black.

* * * * *